United States Patent Office 3,532,321
Patented Oct. 6, 1970

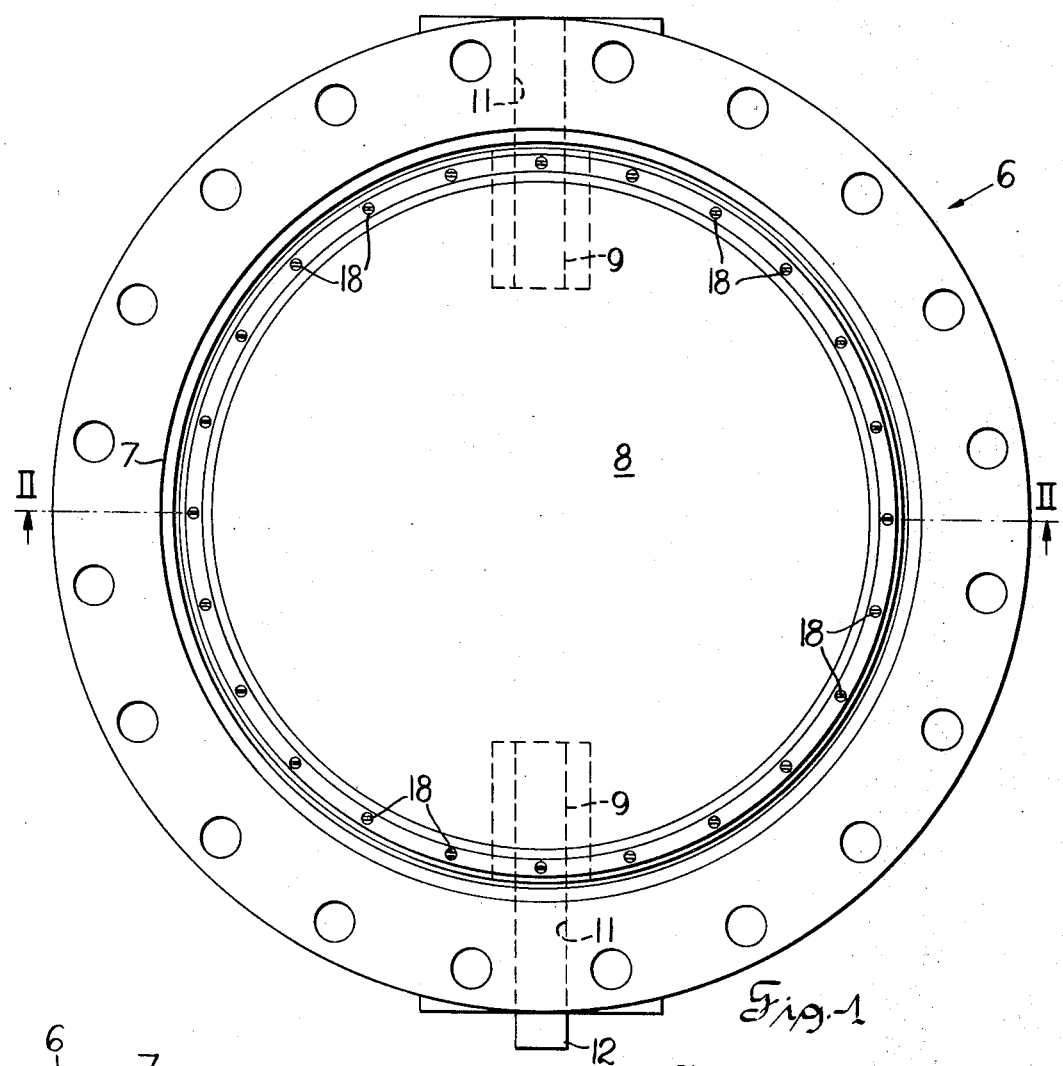
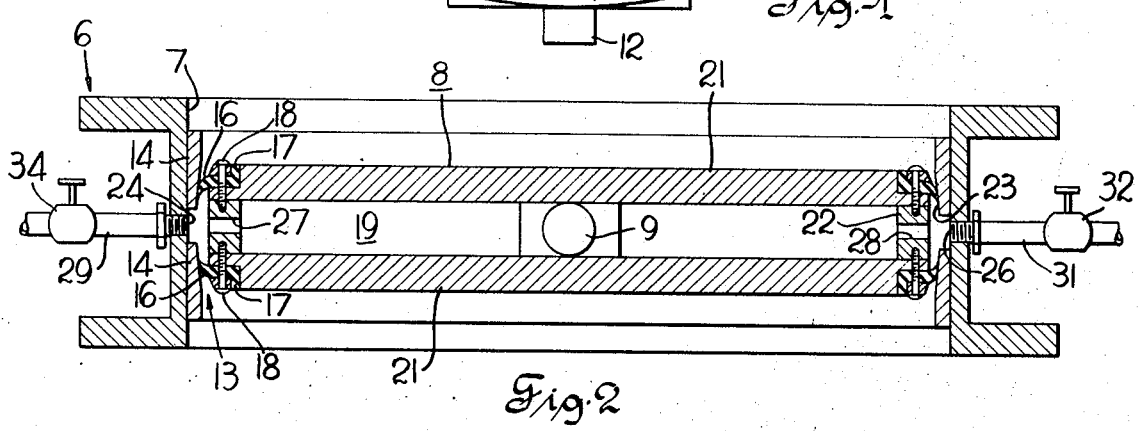

3,532,321
TWIN SEAL BUTTERFLY VALVE
Glenn K. Bowman and Paul E. Fitting, York, Pa., assignors to Allis-Chalmers Manufacturing Company, Milwaukee, Wis.
Filed June 5, 1968, Ser. No. 734,673
Int. Cl. F16k 5/14
U.S. Cl. 251—175                         1 Claim

ABSTRACT OF THE DISCLOSURE

A butterfly valve having sealing means between the valve body and the valve disc which define therebetween an annular fluid chamber. Means are provided to deliver a pressurized fluid to the said chamber at a pressure higher than the pressure of the fluid to be controlled by the valve, thereby insuring a complete shutoff of the fluid being controlled by the valve.

---

This invention pertains to butterfly valves and more particularly to a butterfly valve having sealing means which permit a complete shutoff of the valve.

Conventional valves of the butterfly type employ a disc-like valve member carried by shaft means such as a through shaft or shaft trunnions journaled in the valve body which disc is movable through 90 degrees between a close position in which the disc extends substantially at right angles to the axis of the flow passage and an open position in which the disc extends substantially coincident with such axis. Various sealing arrangements are employed in the construction of butterfly valves. A common type of seal employs a resilient seat into which the valve disc is pressed when in the closed position. Difficulty with this type of sealing arrangement is experienced about the disc trunnions since the seating surface on the disc is on its periphery in line with the disc trunnions. To overcome this particular difficulty, many butterfly valves are constructed such that the seating surface on the disc is laterally offset from the rotational axis of the disc. With this arrangement complete 360 degree uninterrupted seating is permitted. However, even with 360 degree uninterrupted seating it is difficult to insure a complete fluid shutoff with a butterfly valve.

In a great many applications where butterfly valves are utilized, a small amount of leakage is quite acceptable. However, there are also many valve applications where complete fluid shutoff is absolutely necessary. As an example, in applications where caustic fluids are being controlled complete shutoff is necessary.

It is therefore the general object of this invention to provide a butterfly valve which is capable of completely blocking the flow of fluid being controlled by the valve.

Another object of the subject invention is to provide a butterfly valve having sealing means between the valve disc and valve body which define an annular fluid chamber having fluid therein maintained at a pressure above the pressure of the fluid being controlled by the valve.

A further object of the subject invention is to provide a butterfly valve having a pair of laterally spaced sealing elements disposed at opposite sides of the rotational axis of the valve disc each of which provides uninterrupted 360 degrees seating contact between the valve disc and valve body.

A more specific object of the subject invention is to provide a butterfly valve of the hereinbefore described type wherein the pair of sealing elements define an annular fluid chamber into which is directed a fluid maintained at a pressure above the pressure of the fluid being controlled by the valve.

These and other objects of the subject invention will become more fully apparent as the following description is read in light of the attached drawing wherein:

FIG. 1 is an end elevation of a butterfly valve constructed in accordance with the invention; and, FIG. 2 is a cross sectional view of the butterfly valve taken along the lines II—II of FIG. 1.

Referring to the drawing, a butterfly valve is disclosed having a valve body member generally designated 6 including a fluid confining bore 7 extending therethrough. A movable valve disc member generally designated 8 is mounted within the bore 7 and is movable to a position as shown in the drawing in which the disc completely blocks the bore 7 to prevent the flow of fluid through the valve body. The valve disc is provided with valve means such as a shaft extending completely through the disc, or as shown herein for purposes of illustration, the disc may be provided with a pair of shaft trunnions 9 which are rigidly mounted to the valve disc and which passes through journals 11 formed in the valve body 6. One of the shaft trunnions 9 extends completely through its journal to the outside of the valve body such as at 12.

The valve disc 8 is rotated by valve operating means, not shown, that are well known to those skilled in this art, and which forms no part of the present invention. Such valve operating means are applied to rotate the disc 8 from a first position in which the disc presents the smallest possible impedance to the flow of fluid through the valve body to a second position as shown in the drawings in which the disc completely closes the bore 7 in the valve body 6.

Sealing means generally designated 13 are provided between the disc 8 and the body 6. The seal means comprises a pair of seat ring member 14 and a pair of annular resilient seal members 16. These seal members 16 may be attached to either the disc 8 or the valve body 6; however, as herein shown for purposes of illustration, they are connected to the disc 8. As shown herein for purposes of illustration, the resilient members 16 are attached to annular cutouts 17 provided in the peripheral surface of the disc 8. The resilient members may be connected in any conventional manner and are herein shown as being connected thereto by a plurality of circumferentially spaced screws 18 turned into internally threaded bores provided about the periphery of opposite sides of the disc 8. Each resilient member 16 may be L-shaped as herein shown to assist in providing a firm connection to the valve disc. Furthermore, the sealing ends of the resilient members are preferably tapered to a knifelike edge as shown in the drawing.

The seat rings 14 are provided on the interior peripheral surface of the valve body 6 and are connected thereto in any conventional manner such as by welding. The seat rings 14 are preferably provided with a conical surface at the area of contact by the resilient members 16.

The valve disc 8 may be constructed in any convenient manner. As herein shown for purposes of illustration, the disc is constructed of a pair of spaced discs 21 connected at their outer periphery by an annular ring 22. The pair of space discs 21 and the annular ring 22 define an interior fluid chamber 19.

Means are provided to deliver a purging fluid into the chamber 19 and into annular chamber 23 defined by the sealing means 13. To this end, an inlet opening 24 is provided in one end of the valve body and a discharge opening 26 is provided in the opposite end of the valve body. Furthermore, to permit fluid to enter and leave the chamber 19, bores 27 and 28 are provided through the annular ring 22 so as to align with the inlet 24 and outlet 26 in the valve body when the valve is in the closed position shown in the drawing. Inlet conduit means 29 is connected to the inlet 24 and discharge conduit means 31 is connected to the discharge opening 26. Pressure control means are provided to insure adequate pressure of the purging liquid in the chamber 19. This may be accomplished in any convenient manner and as herein shown for purposes of illustration includes an adjustable pressure relief valve 32 provided in the outlet conduit 31. This valve is adjusted to insure that the pressure of the fluid in the chamber 19 is maintained above the pressure of the fluid being controlled by the butterfly valve. Furthermore, if desired, a shutoff valve 34 may be provided in the inlet conduit 29.

In operation when it is desired to open the valve, the valve operating mechanism not shown is adjusted to cause the valve disc to rotate 90 degrees from the position shown in FIG. 2. This presents the smallest impedance to the flow of fluid through the bore of the valve. When the valve disc is rotated to the open position purging fluid in the chamber 19 will be evacuated by the fluid flowing through the valve. Furthermore, the shutoff valve 34 will be closed to interrupt the flow of purging fluid and since the pressure responsive valve 32 is set at a pressure higher than the pressure of the fluid flowing through the butterfly valve, no fluid will flow through the pressure responsive valve.

When it is desired to close the valve the operating mechanism is operated to position the valve disc 8 in the position shown in the drawing. In this position the resilient members 16 are in engagement with the conical surfaces of the valve seats 14 and the bores 27 and 28 in the annular ring 22 are in alignment with the inlet and discharge openings 24 and 26 respectively. The purging fluid shutoff valve 34 is then opened permitting the purging fluid to enter the annular chamber 23 and the chamber 19. Since the purging fluid is at a pressure higher than the pressure of the fluid being controlled by the butterfly valve it causes the resilient members 16 to expand into the seat rings 14 thereby providing a completely fluid type seal.

From the above description it can be seen that a completely fluid type butterfly valve has been described. Because of the pair of spaced sealing means 13 positioned on either side of the shaft trunnions 9 uninterrupted 360 degrees seating is provided. Furthermore, due to the provision of the addition of a purging fluid into the area between the sealing means complete sealing of the fluid flowing through the butterfly valve is insured.

The embodiments of the invention in which an exclusive property or privilege is claimed are defined as follows:

1. A butterfly valve comprising: a valve body having a fluid confining bore therethrough; a valve disc rotatably mounted in said valve body and movable to open and close said bore; a pair of laterally spaced resilient annular seal members connected to the peripheral surface of said disc and extending radially therefrom; a pair of seat rings connected to the interior peripheral surface of said valve body about said bore, said seal members and said seat rings being in fluid sealing contact when said disc is in the closed position and defining with said body and said disc an annular fluid tight chamber therebetween; and pressure fluid conduit means connected to said valve for admission of fluid to said chamber at a pressure above the pressure of the fluid controlled by the valve, the contacting surfaces of said seat rings being bevelled and nonparallel relative to said disc surface to cause the seal member ends to bend toward one another whereby increased pressure in said chamber will increase the sealing pressure between the seal members and seat rings.

References Cited

UNITED STATES PATENTS

| | | | |
|---|---|---|---|
| 965,999 | 8/1910 | Faget | 251—175 |
| 2,039,075 | 4/1936 | Foell | 251—308 X |
| 3,026,083 | 3/1962 | McLaren | 251—173 |
| 3,069,128 | 12/1962 | Grove | 251—173 |
| 3,096,071 | 7/1963 | Fisher | 251—175 X |

CLARENCE R. GORDON, Primary Examiner

U.S. Cl. X.R.

251—306